W. D. THOMSON.
RESILIENT WHEEL.
APPLICATION FILED JULY 29, 1916.

1,368,074.

Patented Feb. 8, 1921.

Witnesses

Inventor
William D. Thomson
By Erwin and Wheeler
Attorneys

UNITED STATES PATENT OFFICE.

WILLIAM D. THOMSON, OF MADISON, WISCONSIN.

RESILIENT WHEEL.

1,368,074.   Specification of Letters Patent.   Patented Feb. 8, 1921.

Application filed July 29, 1916. Serial No. 112,011.

*To all whom it may concern:*

Be it known that I, WILLIAM D. THOMSON, citizen of the United States, residing at Madison, county of Dane, and State of Wisconsin, have invented new and useful Improvements in Resilient Wheels, of which the following is a specification.

My invention relates to improvements in resilient wheels for vehicles.

The object of my invention is to provide improved means for resiliently supporting the hub of a vehicle wheel from the rim and also to provide such wheels with adequate means for resisting side thrusts without impairing their resiliently yielding quality.

In the drawings—

The same reference characters apply to the same parts throughout the drawings and specifications.

Figure 1:
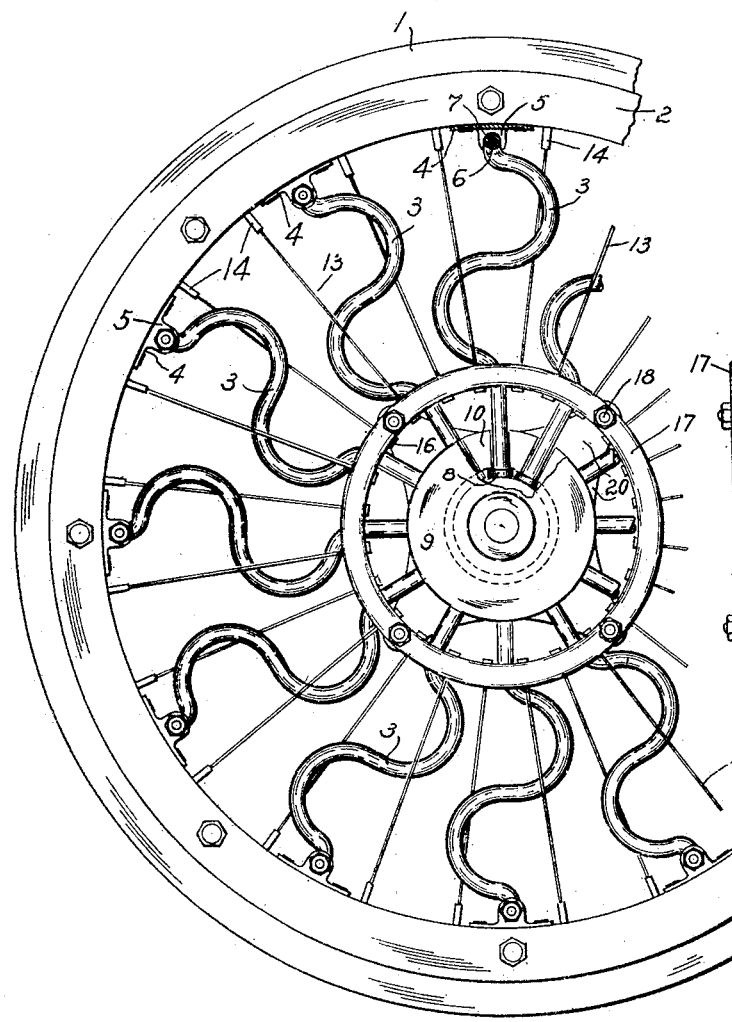
Figure 1 is a fragmentary side elevation, partly in section, of a vehicle wheel embodying my invention.
Figure 2:
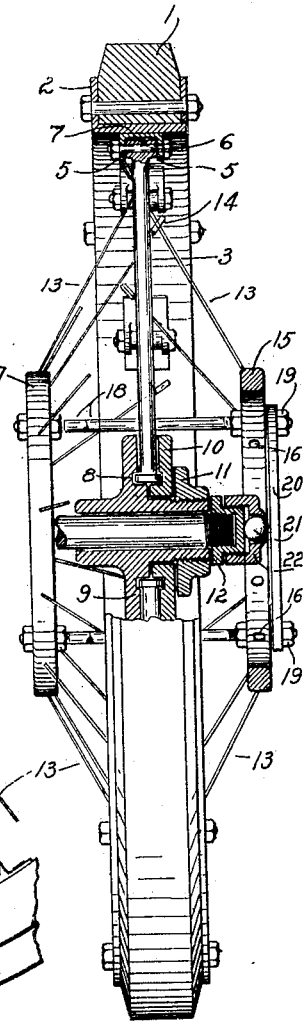
Fig. 2 is an end view of the same with parts broken away to show the interior.

A non-pneumatic tire 1 is bolted in the ordinary fashion to the rim 2. The tire may be of any approved material and may be secured in any desired manner, no specific fastening means being necessary to my invention.

The rim 2 is supported by spokes 3 from the hub. Said spokes are preferably made of spring steel and are made in an S shape or reversely curved for a part of their length. This S shaped portion, preferably comprises the outer part of the spoke and is adapted to yield resiliently to all pressures operating in the plane of the wheel and especially to those acting radially. The inner and outer ends of spokes 3 are in the same radial line and the reversely curved portion preferably extends equally in opposite directions therefrom. At its outer end, each spoke is pivotally secured to the rim, the pivot pin 6 being spaced from the rim, thus allowing the spoke a maximum of flexibility in the plane of the wheel but in no other direction. A connecting plate 4 is fastened to the rim and provided with ears 5. Pivot bolt 6 passes through these ears and the head 7 of the spoke, thus providing a substantial hinge joint between spoke and rim which allows the spokes to bend without abrupt flexion at the point of connection and without bringing them into contact with the rim. The inner end of the spoke is provided with a circular flange 8 which is socketed in a recess formed between flange 9 on the hub and a retaining ring 10, said ring 10 being held in place by the nut 11 threaded on the hub. A hub cap 12 is screwed to the end of the axle in the usual manner. It will be observed that by socketing the spoke flange 8 in the hub flange 9 and the retaining ring 10, a swivel joint is formed between the spoke and the hub. The shank of the spoke has an elongated bearing in the members 9 and 10 between the flange 8 and the peripheral margin of the flange 9, and this shank portion of the spoke extends along a straight line radially to a point between the floating rings 15 and 17, hereinafter described. The curved portion of each spoke is therefore located between the floating rings and the rim. These elongated shanks are an important factor in avoiding crystallization of the spokes such as results where a curved spoke is connected at one end of the curve directly with the hub. Where the curved portion of the spoke is directly connected with the hub, the leverage at the point of connection is great, and substantially all the flexion takes place in the vicinity of this connection, thus causing rapid crystallization. In my improved spoke, however, flexion which tends to occur at the inner end of the curve in the spoke, *i. e.*, at the outer end of the shank, is relieved by the fact that the shank itself yields at its outer end to some extent, although the direction in which the bending pressure is exerted is such that excessive bending of the shank portion of the spoke will not occur. The swiveled connection with the hub avoids crystallization such as would otherwise be caused by twisting strains.

Thus far I have described only the load-bearing part of my wheel. To protect against side thrust, I adopt the expedient of providing rings floated from the rim on each side of the wheel and rigidly spaced from each other. Spokes 13, preferably made of wire, are screwed into nipples 14 which, in turn, are fastened into the rim. The spokes may be screwed into these nipples to attain any desired degree of spoke tension. One set of the wire spokes is fastened near the inner edge of the rim. These cross the plane of the wheel and support floating ring 15 through which they are led and held by spoke head 16. A second set of wire spokes is fastened to the rim adjacent to its outer edge. These spokes support inner floating ring 17. The two floating rings are braced and spaced from each other, by means of rods 18 which extend between the resilient spokes and connect ring 17 to ring 15 at intervals of their circumference. The nuts 19 on the outer ends of bolts 18 also serve to fasten plate 20 to ring 15, through which said ring is supported against inward movement relatively to outer end of the axle. A ball 21 is preferably mounted in cap 22 which, in turn, is screwed to hub cap 12. The plate 20 is adapted to bear against ball 21 for the purpose of taking up an inward thrust against the wheel. The ball lessens the friction and can readily be renewed when worn.

When my improved wheel is in use, the tire 1 will serve to protect the felly but it need not be resilient. The cushioning effects are secured by springs 3 which, when weight is applied to the axle, will all flex in such a manner as to resiliently support the axle at a point which may be slightly lower than the center of the wheel. The peculiar S shape of the outer end of the resilient spokes, allows those spokes above the axle to expand and those below to contract radially, while the pivotal connection provided by bolt 6 allows the proper flexion of these spokes at either side of the wheel. The wire spokes 13 with rings 15 and 17 and cross bars 18 form a truss which effectively guards against the dishing of the wheel. As further protection, plate 20 is provided, with its bearing against ball 21 on the end of the axle. No matter what position the axle assumes relative to ring 15, the ball 21 will still have a bearing point somewhere on plate 20. In this way, I have succeeded in making my wheel sufficiently rigid laterally and yet extremely resilient in a vertical plane in its support of the axle. Also, by providing the truss construction as a guard against side thrusts, I am able to make the spokes 3 with a relatively small diameter, yet with sufficient rigidity to support, with a resilient action, the loads imposed upon the axle by the vehicle which it carries, whereby a wheel comparatively light in weight is provided. Formerly, in a construction of this kind, it was necessary to provide broad flat spokes to take up side thrusts while permitting a vertical resiliency.

It will be understood that dust proofing devices, driving devices for use on driven wheels and other structures of common use are well known and hence do not appear in the drawing or specification.

In the foregoing description setting forth the specific structure illustrated, I do not intend to limit the scope of my invention to exclude any mechanical equivalents for the parts and combinations disclosed, the terms employed being used in the description and the appended claims as terms of description and not of limitation.

I claim—

1. A resilient wheel, including the combination with a hub and a rim, of a set of resilient spokes, each having swiveled connection with the hub and pivotal connection with the rim, said spokes extending along radial lines to a substantial distance from the hub, and having their outer portions reversely curved substantially in the central plane of the wheel rim.

2. The structure set forth in claim 1, in which the swiveled inner end of the spoke is provided with an elongated bearing in the hub following a radius of the wheel.

In testimony whereof I affix my signature in the presence of two witnesses.

WILLIAM D. THOMSON.

Witnesses:
 RALPH E. KING,
 CHAS. POLLACK.